J. G. BREWER.
MECHANICAL FILTER.
APPLICATION FILED JULY 28, 1908.

920,909.

Patented May 11, 1909.
9 SHEETS—SHEET 1.

WITNESSES:
Wm F Hoyle
Martin T. Fisher

INVENTOR
J. G. Brewer.
BY
Wilkinson, Fisher & Witherspoon
Attorneys.

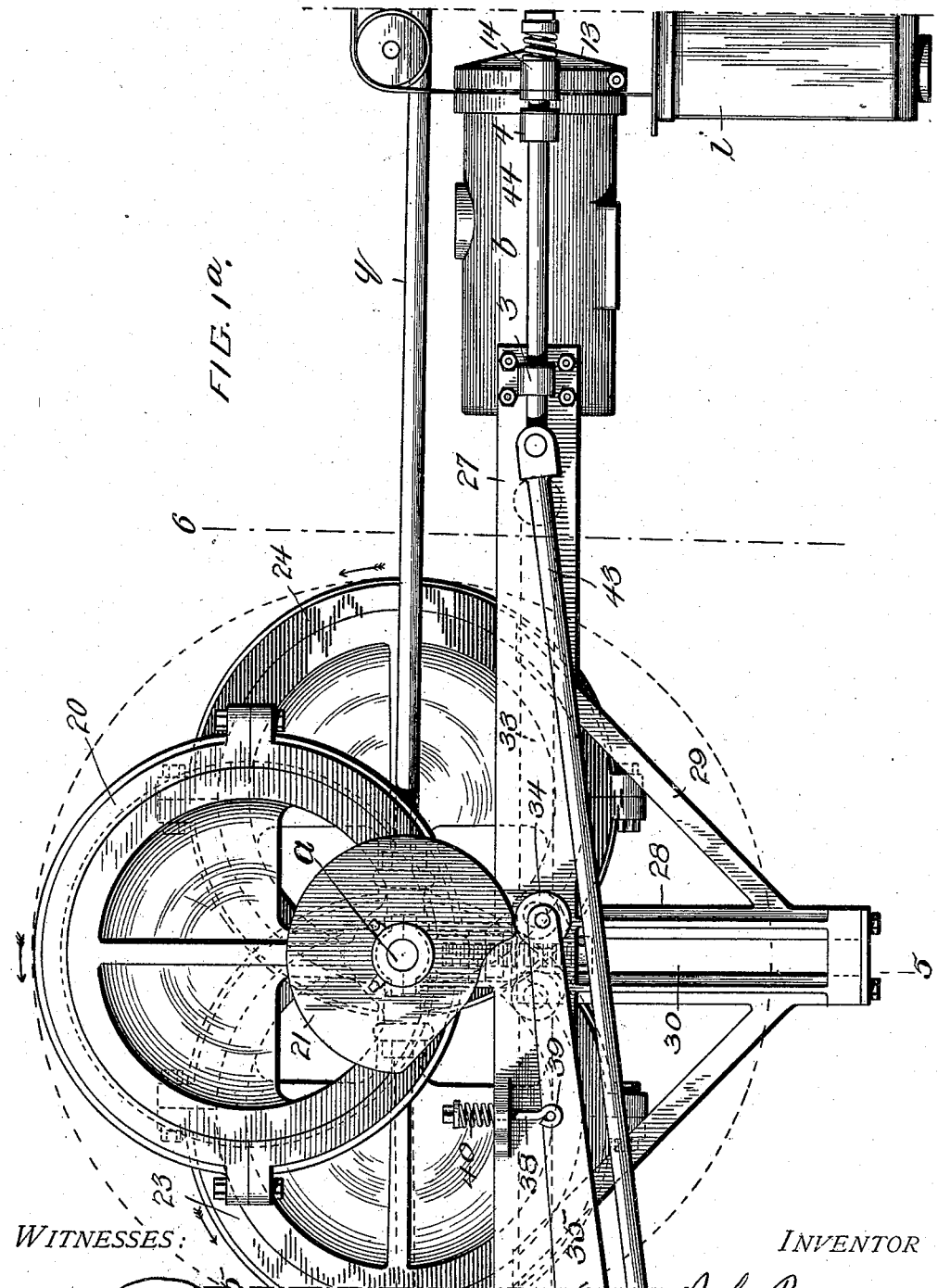

J. G. BREWER.
MECHANICAL FILTER.
APPLICATION FILED JULY 28, 1908.
920,909.
Patented May 11, 1909.
9 SHEETS—SHEET 3.
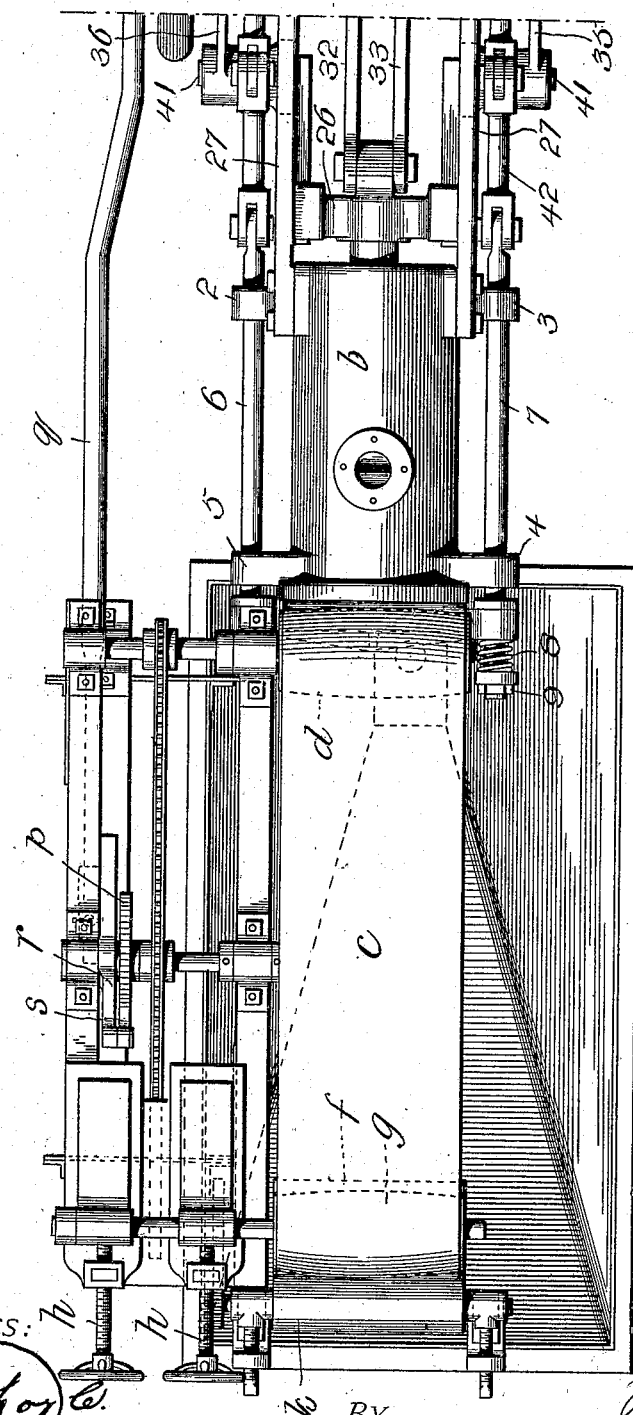
WITNESSES:
INVENTOR
J. G. Brewer.
BY
Wilkinson, Fisher & Witherspoon
Attorneys.

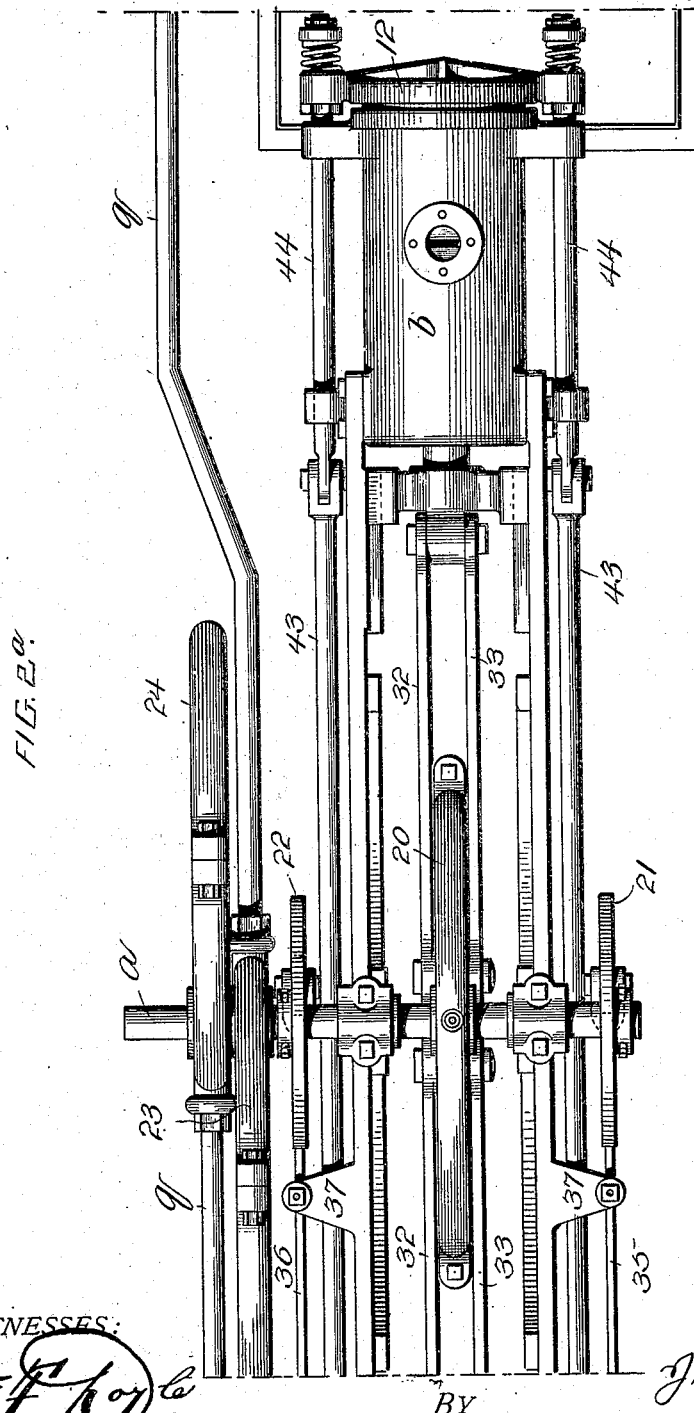

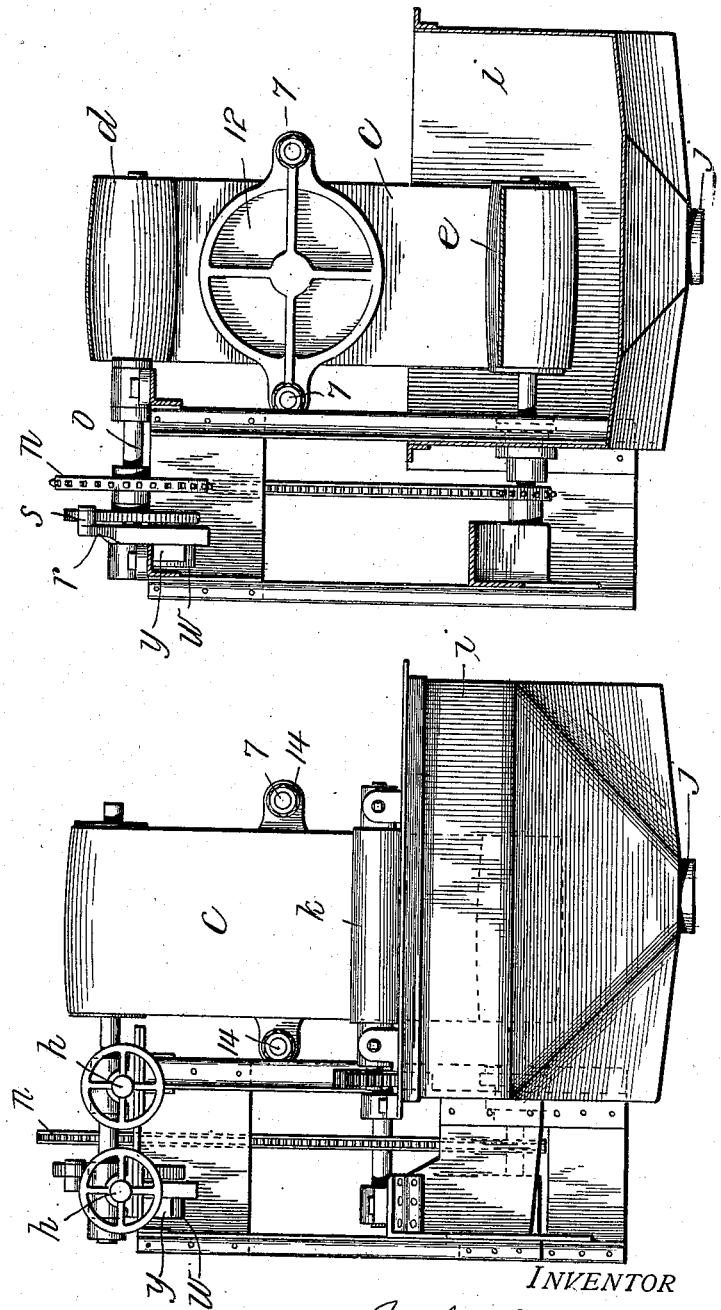

J. G. BREWER.
MECHANICAL FILTER.
APPLICATION FILED JULY 28, 1908.
920,909.
Patented May 11, 1909.
9 SHEETS—SHEET 6.
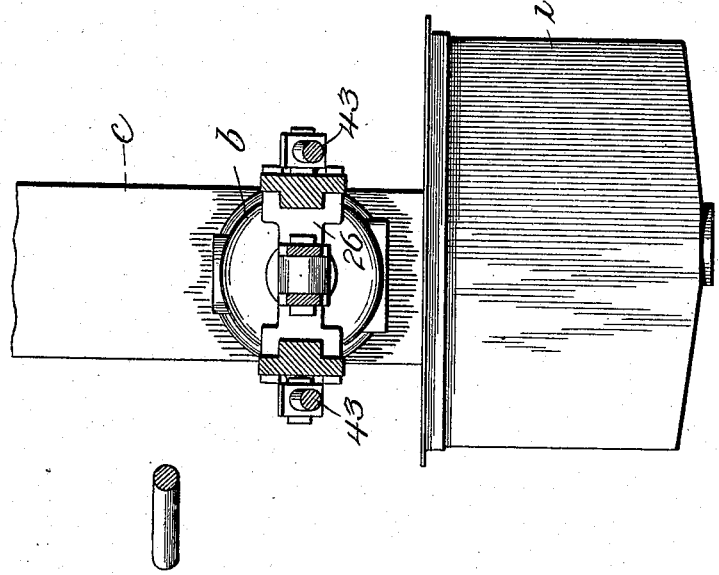
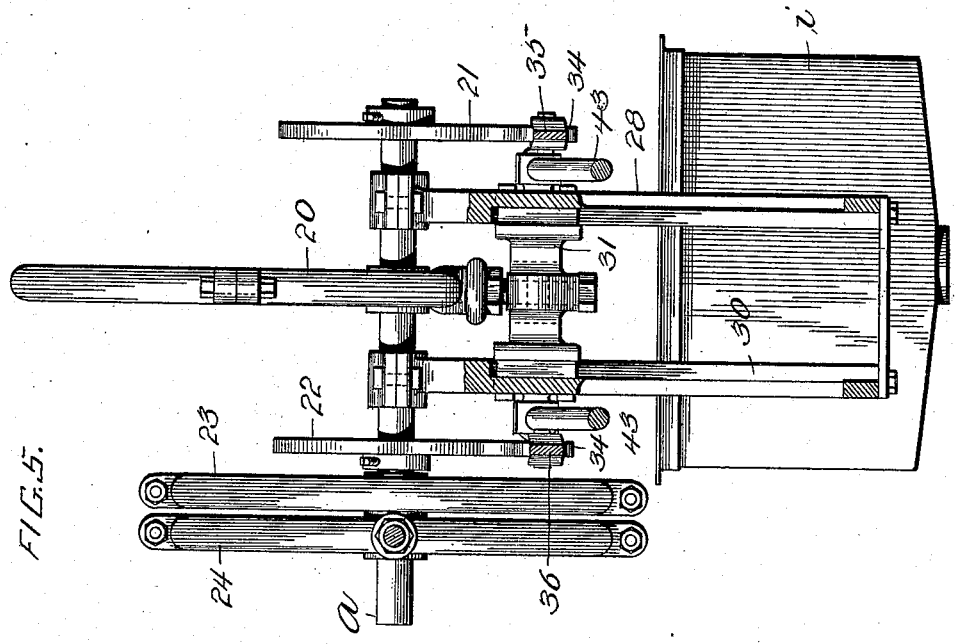

J. G. BREWER.
MECHANICAL FILTER.
APPLICATION FILED JULY 28, 1908.

920,909.

Patented May 11, 1909.
9 SHEETS—SHEET 7.

WITNESSES
INVENTOR
J. G. Brewer.
BY
Wilkinson, Fisher & Witherspoon,
Attorneys.

J. G. BREWER.
MECHANICAL FILTER.
APPLICATION FILED JULY 28, 1908.
920,909.
Patented May 11, 1909.
9 SHEETS—SHEET 8.
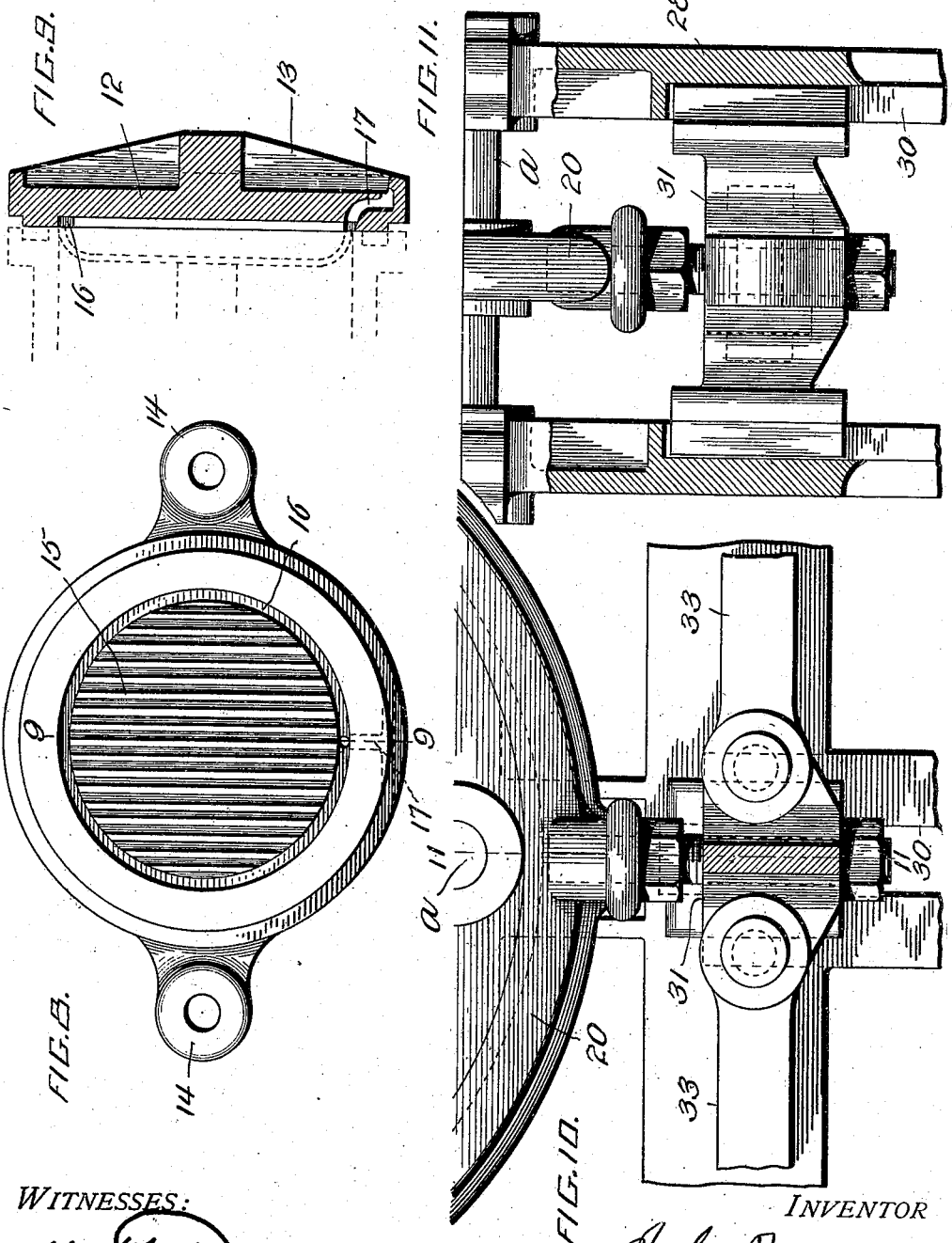
WITNESSES:
INVENTOR
J. G. Brewer.
BY Wilkinson, Fisher & Witherspoon
Attorneys.

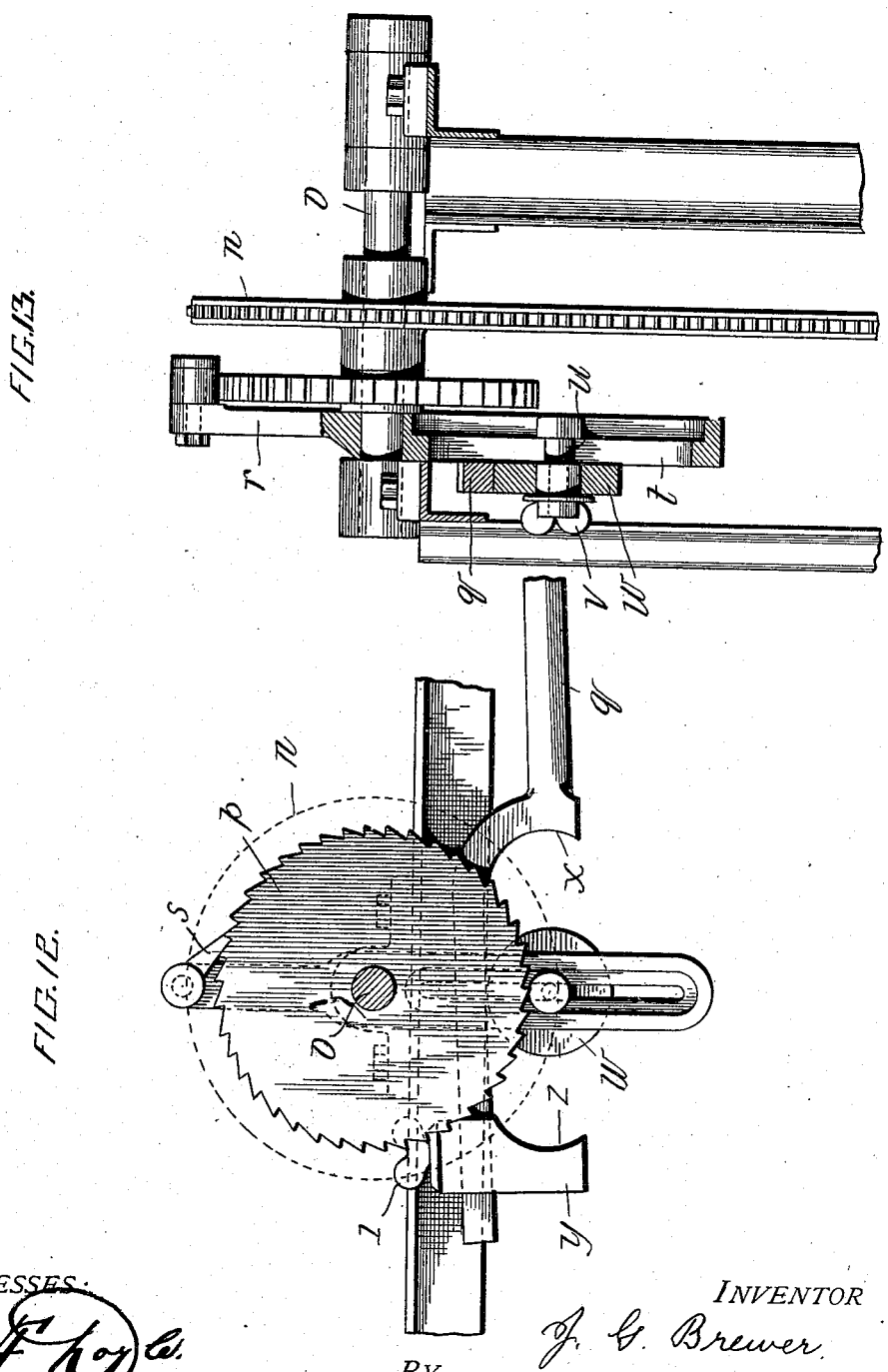

UNITED STATES PATENT OFFICE.

JOHN G. BREWER, OF RACELAND, LOUISIANA.

MECHANICAL FILTER.

No. 920,909. Specification of Letters Patent. Patented May 11, 1909.

Application filed July 28, 1908. Serial No. 445,785.

*To all whom it may concern:*

Be it known that I, JOHN G. BREWER, a citizen of the United States, residing at Raceland, in the parish of Lafourche and State of Louisiana, have invented new and useful Improvements in Mechanical Filters; and I do hereby declare the following to be a full, clear, and exact description of the invention, such as will enable others skilled in the art to which it appertains to make and use the same.

My invention relates to improvements in mechanical filters and is particularly adapted for use in sugar and cotton seed oil mills. It is, however, not restricted to these uses, as being purely a mechanical filter it is adapted for filtering all kinds of solutions.

The object of my invention is to produce a mechanically operated filter pump, through which an endless strip of filtering material travels at intervals, the pump being provided with a movable head, so that after one charge of liquid has been filtered, the strip of filtering material may be moved forward to expose a clean surface for the next charge of liquid. The roll of filtering material is automatically washed and dried and the movements of the pump piston, the pump head and the filtering correlated so that each will take place at the proper time.

Further objects will appear in the detailed description.

Figure 1:
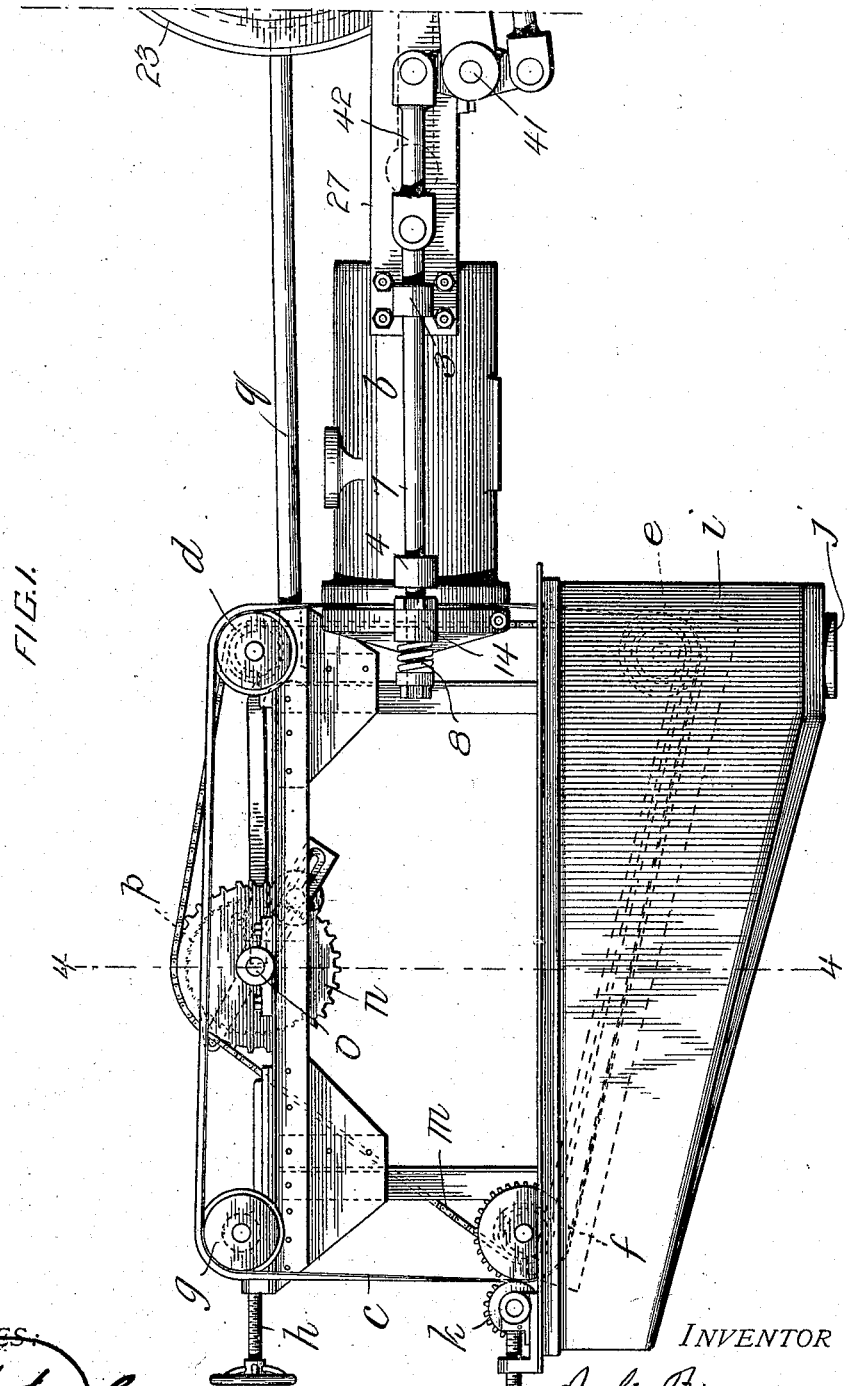
Figure 7:
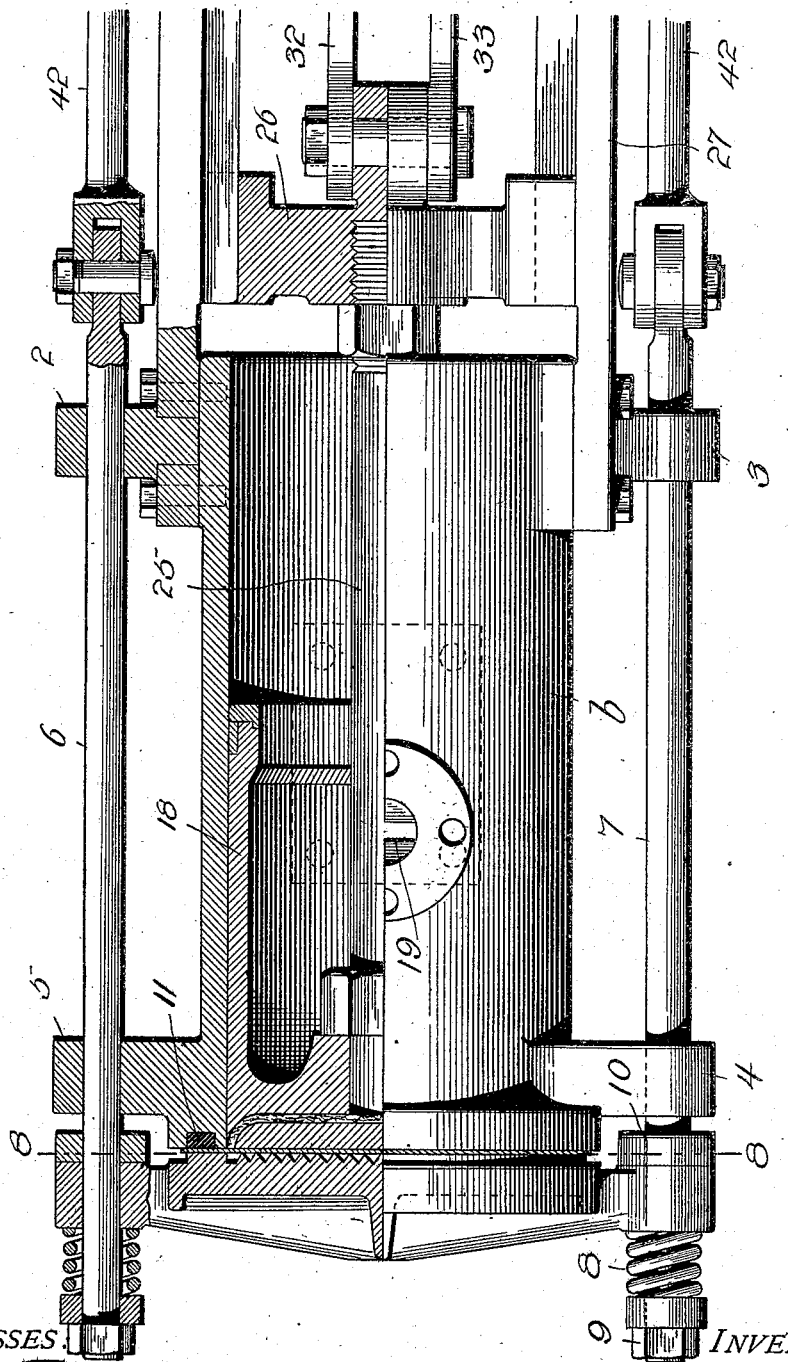

In the accompanying drawings—Figures 1 and 1ª, which are to be taken together, represent my invention in side elevation. Figs 2 and 2ª, which are to be taken together, represent my invention in plan view. Fig. 3 is an end view of the washing tank and adjacent parts. Fig. 4 is a cross section of the parts shown in Fig. 3, taken on the line 4—4 of Fig. 1. Fig. 5 is a cross section, showing the operating eccentrics and cams. Fig. 6 is a cross section on the line 6—6 of Fig. 1ª. Fig. 7 is a plan view of one of the pumps, partly in section. Fig. 8 is a cross section on the line 8—8 of Fig. 7. Fig. 9 is a cross section, on the line 9—9 of Fig. 8, through one of the pump heads, adjacent parts being shown in dotted lines. Fig. 10 is a side view, on a larger scale, of the lower part of one of the operating eccentrics, the adjacent parts being shown in section. Fig. 11 is a cross section on the line 11—11 of Fig. 10. Fig. 12 is a side view of the ratchet wheel for moving the strip of filtering material and adjacent parts. Fig. 13 is an end view of the same, partly in section.

In the drawing I have shown operating means and a pump and filter on each side. In actual use, however, it is designed to have two batteries of filtering pumps, one for each side of the operating shaft.

$a$ represents the operating shaft, having cams and eccentrics, $b$ the pumps with movable heads, through which passes the filtering medium $c$ which is an endless strip of cloth, woven wire or any suitable material.

The endless filter $c$ passes around four rollers $d$, $e$, $f$ and $g$, the last being an idler and provided with adjustable bearings which may be moved by screws $h$, to take up the slack. The filter strip passes down over the roller $e$ into a washing tank $i$, provided with an inclined bottom and a discharge port $j$ at its lowest part, usually closed by a valve. In use the tank is filled with hot water. The roller $f$ is located partly within and partly outside of the tank $i$ and, in connection with the roller $k$, which is preferably covered with rubber, forms a wringer, which insures that the filter strip shall be clean and practically dry as it leaves the tank. Each of the rollers $f$ and $k$ is provided with a gear wheel, the two meshing together, so that the rollers revolve in unison.

The rollers $d$, $e$ and $f$, are each provided with a sprocket wheel over which runs a sprocket chain $m$. This chain also runs over a sprocket wheel $n$ on the shaft $o$. On this shaft is fixed a ratchet wheel $p$, which is operated by the movement of the rod $q$ in the following manner: On the shaft $o$ is loosely mounted an arm $r$, carrying a pawl $s$ on its upper end and having its lower part provided with a long slot $t$, through which passes the headed pin $u$, provided with a thumb nut $v$, and carrying a roller $w$, loosely mounted thereon, this construction providing an easy means of adjustment. The arm $q$ is curved and bent upward near its end, forming a curve $x$ adapted to engage the roller $w$, and a perforated block $y$, similarly curved at $z$, is adjustably secured to the rod $q$ near its end by the thumb nut 1. A retaining pawl (not shown) may be used to prevent backward movement of the ratchet wheel $p$.

Referring especially to Fig. 7, the pump $b$ consists of a cylinder provided at each end with perforated extensions 2, 3, 4 and 5, either made integral with the cylinder or secured thereto. Through these extensions loosely pass the rods 6 and 7, and the outer ends of these rods are provided with strong coiled springs 8 encircling them and with adjustable nuts 9, said springs tending to hold the movable pump head firmly against one end of the cylinder which is open at both ends. Firmly attached to each of the rods 6 and 7 is a washer or stop, such as 10, which limits the inward movement of the pump head toward the cylinder. A packing 11, of rubber or other suitable material, is located in a groove in the end of the cylinder, to prevent leakage.

The movable pump head is best shown in Figs. 8 and 9. It consists of a body portion 12, provided with strengthening ribs 13 and with perforated ears 14, through which the rods 6 and 7 pass. On its inner face it is provided with a series of vertical parallel ribs 15, leaving passages between them which communicate with an annular groove 16. This groove delivers into a discharge passage 17, from which the filtered liquid is discharged into a funnel and led off to a receptacle, the funnel and receptacle not being shown. The pump piston 18 consists of a cylinder open at one end and closed at the other, both ends being suitably packed, and connected to the piston rod 25. The pump cylinder is provided with an opening 19, through which the liquid to be filtered flows in by gravity or is forced in under pressure.

The operating means will next be described. On the shaft $a$ is mounted an eccentric 20 for operating the pump pistons, cams 21 and 22 for operating the pump heads and eccentrics 23 and 24 for operating the filter moving means. The piston rod 25 is connected to a cross head 26 which slides in suitable guides in the main frame 27, which supports the operating parts and the pumps on each side. Depending from the frame is the guide frame 28 provided with braces 29. The frame 28 is provided with guide grooves 30, in which slides the cross head 31, which is connected to the eccentric 20. Pivotally attached to the cross head 31 are two parallel arms 32 and 33, which connect the cross heads 26 and 31, the construction being the same on both sides of the main shaft. From this construction it is obvious that the motion of the eccentric 20, which causes the cross head 31 to rise and fall, will in turn reciprocate the cross head 26 at intervals. The parts are so proportioned that the piston 18, which is moved by the cross head 26, is caused to move back and forth at intervals, but with a "dwell" at certain times.

The piston heads are operated in the following manner: The cams 21 and 22, on the shaft $a$, contact with rollers, such as 34, on the arms 35 and 36. On the frame 27 is a perforated extension 37 through which passes a rod 38 having a hooked end engaging a pin 39 on the arm 35. A spring 40 surrounds the rod 38 and holds the roller 34 always in contact with the cam 21, a similar construction being applied to the arm 36. The arm 35 has its outer end enlarged into a T, the whole forming a double bell crank lever, which is pivoted at 41 on the frame 27. To the upper part of this T is pivoted a link 42, the other end of which is pivoted to the rod 7, the construction being the same as to the arm 36. From this construction it is evident that the rotation of the shaft $a$ will open and close the cylinder head 12 at intervals and the parts are so proportioned that there is a "dwell" between these movements. The cylinder head on the right hand pump is also operated by the movement of the arms 35 and 36 as follows: To the lower end of the T head of the arm 35 is pivotally attached a long rod 43, the other end of which is pivoted to the sliding rod 44 attached to the cylinder head, the construction on both sides of the pump being the same.

From this construction, it is evident that the cams 21 and 22 are so placed on power shaft so their rotation will open the cylinder heads of the two units simultaneously, and are so placed as to close them also simultaneously. The two cams are so constructed as to produce the "dwell" of the motion at the proper time simultaneously for each end. The eccentric 24 is connected to the rod $q$ and operates the ratchet wheel $p$ by the connections already described. By a similar construction the eccentric 23 operates the ratchet wheel on the opposite side.

The operation is as follows: The parts being in the position shown in Fig. 7, the main shaft $a$ is set in motion the piston 18 is drawn to the right and the cylinder head 12 simultaneously drawn to the left. Immediately afterward the ratchet wheel $p$ is operated, feeding a fresh portion of the filter band between the cylinder head and the cylinder. Just as the piston is about to uncover the inlet opening 19, the cylinder head is closed, the feeding of the filter band having previously been stopped. When the opening 19 is free the liquid to be filtered runs into the cylinder 18. On the return stroke of the piston the liquid is forced through the filter band, running out through the passage 17 and the cycle of operations is repeated indefinitely, the filter band being cleaned as above described. The same cycles of operation take place at both ends and are simultaneous.

While I have thus described my invention, I wish it to be expressly understood that I do not limit myself to the exact construction described and shown, as this could be varied greatly without departing from the spirit of my invention.

I claim:—

1. In a mechanical filter, the combination of a pump, a filter band and means for operating said pump and feeding a fresh portion of said band into operative relation with said pump at intervals by a step by step movement, substantially as described.

2. In a mechanical filter, the combination of a pump, having a movable head, a filter band and means for operating said pump and feeding a fresh portion of said band between the pump and its head at intervals, substantially as described.

3. In a mechanical filter, the combination of a pump having a movable head, an endless filter band adapted to be clamped at intervals between the pump and its head, means for operating said pump and its head and means for feeding a fresh portion of said band between said pump and its head at intervals, substantially as described.

4. In a mechanical filter, the combination of a pump, an endless filter band, means for cleansing the used portion of said band and means for operating said pump and feeding said band to expose fresh, clean filtering surfaces at intervals by a step by step movement to the action of the liquid moved by said pump, substantially as described.

5. In a mechanical filter, the combination of a pump having a movable head, an endless filter band adapted to be fed between said pump and its head and means for simultaneously moving said head away from said pump and feeding a fresh portion of said filter band between said pump and its head, substantially as described.

6. In a mechanical filter, the combination of a pump having a movable head, an endless filter band, devices for cleansing said band, and means for simultaneously moving said head away from the pump and feeding a fresh portion of said filter band between the pump and its head, substantially as described.

7. In a mechanical filter, the combination of an endless filter band, means for forcing a liquid under treatment through successive portions of said band, devices for cleansing the used portion of said band and mechanism for presenting fresh portions of said band at intervals by a step by step movement to the forcing means, substantially as described.

8. In a mechanical filter, the combination of a pump, having a movable head, an endless filter band adapted to be fed between said pump and its head, means for simultaneously moving said head and feeding said band and means for simultaneously closing said head and operating said pump, substantially as described.

9. In a mechanical filter, the combination of a pump having a movable head, an endless filter band, means for simultaneously moving said head and feeding a fresh portion of said band between said pump and its head, means for simultaneously closing said head and operating said pump, and devices for cleansing said band, substantially as described.

10. In a mechanical filter, the combination of an endless filter band, a pump having a movable head provided with means for the escape of liquids, means for simultaneously moving said head and feeding a fresh portion of said band between said pump and its head, and devices for cleansing said band, substantially as described.

11. In a mechanical filter, the combination of a pump, having a movable head, an endless filter band, means for feeding said band between said pump and its head at intervals and devices for cleansing and drying said band in its movement, substantially as described.

12. In a mechanical filter, the combination of an operating shaft provided with eccentrics and cams, a pump having a movable head and a piston, an endless filter band, and devices driven by said eccentrics and cams for coördinately moving said head, piston and band, substantially as described.

In testimony whereof, I affix my signature, in presence of two witnesses.

JOHN G. BREWER.

Witnesses:
 JULES GOOCHAUS,
 FERDINAND E. LAWE.